United States Patent
Rupp et al.

[11] Patent Number: 6,144,464
[45] Date of Patent: *Nov. 7, 2000

[54] METHOD AND SYSTEM FOR MODIFICATION OF FAX DATA RATE OVER WIRELESS CHANNELS

[75] Inventors: Scott W. Rupp, Grantsville; John Wheeler, Salt Lake City; Brady Brown, Layton, all of Utah

[73] Assignee: 3Com Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/927,693

[22] Filed: Sep. 11, 1997

[51] Int. Cl.$^7$ .................................................... H04N 1/32
[52] U.S. Cl. ............. 358/442; 379/102.01; 379/102.02; 379/100.06
[58] Field of Search ................................... 358/400, 405, 358/407, 409, 434, 436, 435, 438, 439, 442, 443; 379/100.01, 100.06, 100.09, 100.12, 102.01, 102.02

[56] References Cited

U.S. PATENT DOCUMENTS

| | | | |
|---|---|---|---|
| 3,558,811 | 1/1971 | Montevecchio | 178/6 |
| 4,153,916 | 5/1979 | Miwa | 358/257 |
| 4,697,281 | 9/1987 | O'Sullivan | 379/59 |
| 5,237,429 | 8/1993 | Zuiss | 358/442 |
| 5,257,397 | 10/1993 | Barzegar et al. | 455/33.1 |
| 5,299,024 | 3/1994 | Kafri | 358/400 |
| 5,367,563 | 11/1994 | Sainton | 379/98 |
| 5,377,260 | 12/1994 | Long | 379/95 |
| 5,386,590 | 1/1995 | Dolan | 455/33.1 |
| 5,479,480 | 12/1995 | Scott | 379/59 |
| 5,491,565 | 2/1996 | Naper | 358/468 |
| 5,507,033 | 4/1996 | Dolan | 455/33.1 |
| 5,509,050 | 4/1996 | Berland | 379/100.01 |
| 5,517,557 | 5/1996 | Tanaka | 379/67 |
| 5,533,029 | 7/1996 | Gardner | 370/94.1 |
| 5,535,242 | 7/1996 | Brigida et al. | 375/222 |
| 5,541,955 | 7/1996 | Jacobsmeyer | 375/222 |
| 5,544,222 | 8/1996 | Robinson et al. | 379/58 |
| 5,546,448 | 8/1996 | Caswell et al. | 379/142 |
| 5,570,389 | 10/1996 | Rossi | 375/220 |
| 5,600,712 | 2/1997 | Hanson et al. | 379/142 |
| 5,802,483 | 9/1998 | Morris | 455/557 |
| 5,857,147 | 1/1999 | Gardner | 455/67.1 |

FOREIGN PATENT DOCUMENTS 63-148719  6/1988  Japan ............................. H04B 1/44

OTHER PUBLICATIONS

Newtons Telecom Dictionary; Harry Newton; p. 8315, 1998.

*Primary Examiner*—Jerome Grant, II
*Attorney, Agent, or Firm*—Workman Nydegger Seeley

[57] ABSTRACT

A method and apparatus for improving the successful transmission of facsimile data over a wireless communication channel is provided comprising a facsimile machine, a wireless transceiver and a connector interfacing therebetween. The facsimile machine detects an interface with the wireless transceiver and notifies the facsimile machine of a wireless communication channel through which facsimile data will traverse. The facsimile machine, in conjunction with the wireless transceiver, establishes a wireless communication channel according to an initial data transfer rate corresponding with the capability of the wireless transceiver or known communication channel conditions. The facsimile machine then exchanges facsimile data over the wireless communication channel and a receiving facsimile machine evaluates the facsimile data to detect errors injected through the wireless communication channel. When such errors are detected, the facsimile machine may institute retransmission of the previous facsimile data relying upon an anticipated improved condition of the wireless communication channel. When the conditions of this wireless communication channel have not improved, the facsimile machine renegotiates a data transfer rate more conducive with the present capability of the wireless communication channel. A facsimile machine further determines when the wireless transceiver is removed and reverts back to traditional wired communication channel data rates.

24 Claims, 5 Drawing Sheets

METHOD AND SYSTEM FOR MODIFICATION OF FAX DATA RATE OVER WIRELESS CHANNELS

BACKGROUND OF THE INVENTION

1. The Field of the Invention

This invention relates to facsimile transmission over a network structure. More, particularly, this invention relates to facsimile transmission over a wireless communication channel wherein the wireless communication channel may exhibit fading and channel interference.

2. Description of Related Art

Thomas et al., U.S. Pat. No. 5,649,001, which is hereby incorporated by reference in its entirety for the material disclosed therein, discloses a reconfigurable communication interface device to identify a valid communication adaptor cable.

3. Present State of the Art

Traditional facsimile transmissions have occurred over wired communication channels such as those characteristic of the public switch telephone network (PSTN). While such wired communication channels may be susceptible to interfering signals, interference on such hard wired communication channels is generally minimal. As such, facsimile transmission rates generally keep pace with technological advancements in modulation theory. For example, traditional facsimiles were transmitted at baud rates consistent with those of data modem transmissions. As modulation techniques for data modems advanced, so also did facsimile transmission techniques. Modernly, data transmission techniques may employ modulation rates in excess of 56.6 kilobits per second. Such high modulation rates require minimal noise injection onto the communication channel. As modulation data rates increase, the coding or frequency spacing between information bits becomes more narrow and therefore more congested. Therefore, high modulation data rate techniques require robust communication channels for reliable transmission of high data rate data.

Technological advancements, in parallel with those of modulation advancements such as facsimile and data transmissions, have also occurred in the area of wireless communication. One such example were wireless technologies have become ubiquitous relates to cellular telephony. Cellular telephony, or more broadly wireless communication, enables a user to roam freely within a designated zone and establish a wireless communication channel with a remote party. Because of the roaming freedom available to a cellular telephone user, wireless communication channels exhibit varying levels of interfering noise, and hence reliability, during a particular communication session. In fact, during a particular transmission session a cellular user may widely roam, thereby subjecting the wireless communication channel to varying and ofttimes unpredictable levels of noise or interference.

In a communication session between a cellular telephone user and a remote party wherein the session parties are exchanging analog voice information, variations and interference are often tolerable due to the context nature of voice communication. Additionally, cellular users may also recognize the presence of interference due to their present location or orientation and institute corrective measures, such as repositioning the cellular transceiver to a more favorable location. When interference adversely affects a wireless voice communication session, a user may simply request that the other party repeat the previous statement.

As cellular technology advanced, cellular transceivers incorporated capability for facilitating transmission of data information across the established wireless communication channel. As a data transmitter and receiver, a facsimile machine became a candidate for interfacing with a cellular transceiver for sending and receiving facsimiles. Cellular transceiver users transceiving facsimiles over cellular networks have become frustrated with the unreliability of transmissions primarily due to the interference impairments of wireless communication channels. Modern facsimile protocols recognize that impairments to communication channels result in injected errors within the facsimile transmission. At least one such facsimile protocol incorporates an error correction mode (ECM) wherein a block of facsimile data is partitioned and appended with a cyclically redundant code (CRC). A facsimile receiver, upon receipt of the partitioned block and appended CRC, evaluates the sequencing of data within the partitioned block and compares that sequencing against the corresponding appended CRC. When the CRC does not match the pattern as generated from the received data, an error in the transmitted data is detected. Techniques exist for accepting a predetermined number of errors in facsimile data without requesting the transmitting entity to retransmit the previous portion of facsimile data.

In wireless communication channels, however, typical interference frequently injects a substantial number of errors into the transmitted facsimile data portion, thus prohibiting a facsimile receiver from accepting that portion of the facsimile data. Such rejection causes the transmitter to retransmit the previous block of facsimile data. Frequently, a subsequent retransmission fares only as well as the previous transmission due to the characteristics of a wireless communication channel. Typically the result of such a scenario is that a transmitter and receiver continuously retransmit the same block of facsimile data until one party recognizes the futility of the present situation. As illustrated in FIG. 1, a facsimile machine may take the form of an integrated device such as facsimile machine 110 or alternatively, may take the form of a host 100 such as a personal computer coupled to a fax modem 102 for performing the integrated facsimile function. As illustrated by FIG. 1, a facsimile machine 110 and a facsimile machine 112 comprised of a host and a fax modem, interoperate and communicate via wired communication channels 104 and 108 interconnected via a communication network 106 such as a public switched telephone network. Because of the wired connection between facsimile machines, minimal noise is injected into the communication channels thereby facilitating modulation techniques employing higher data rate techniques. While such high data rate modulation techniques may be adequate for wired communication channels, wireless communication channels, however, are far more susceptible to interference.

Thus, it appears that there exists no present technique for a facsimile machine to detect transmission of facsimile data over a wireless communication channel and modify the characteristics of the transmission of such facsimile data in such a manner to more reliably deliver facsimile data to a recipient facsimile machine. Furthermore, there does not currently exist techniques for determining the characteristic of the communication channel through which facsimile data will be transmitted and therefrom modify a retransmission criterion, recognizing that wireless communication channels may sustain an enhanced interference level for a subtained period of time. Therefore, a need exists for providing a method and system for recognizing a wireless communication channel as the channel through which facsimile data will be transmitted and accordingly modify accordingly the transmission characteristics of such a transmission of facsimile data.

SUMMARY AND OBJECTS OF THE INVENTION

It is an object of the present invention to provide a facsimile machine capable of detecting interconnection to a wireless transceiver for the establishment of a wireless communication channel through which facsimile data will be passed.

Another object of the present invention is to provide a facsimile machine capable of modifying the data transfer rate of facsimile data when a wireless communication channel is to be employed for transceiving facsimile data.

A still further object of the present invention is to provide a facsimile machine capable of detecting errors in facsimile data transferred over a wireless communication channel.

Yet another object of the present invention is to provide a facsimile machine capable of modifying the data transfer rate of facsimile data when retransmission attempts fail to eliminate errors in the facsimile data transferred over a wireless communication channel.

A still further object of the present invention is to provide a facsimile machine capable of modifying the data transfer rate of facsimile data over a wireless communication channel and reverting to normal data transfer rate selection when facsimile data reverts to transmission via a wired communication channel.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims. To achieve the foregoing objects, and in accordance with the invention as embodied and broadly described herein, a method and system for modification of a data transmission rate for facsimile data over a wireless communication channel is provided.

Wireless communication channels provide new challenges for transmission of facsimile data due to the unpredictable levels of interference that are generally and transiently present. To accommodate such challenges in transmitting facsimile data, a facsimile machine is provided for compensating for such unpredictable characteristics of wireless transmissions. The facsimile machine of the present invention has an interface through which a wireless transceiver may be detected. The facsimile machine couples to a wireless transceiver through a connector which provides both a conduit for the transmission and reception of data information and furthermore provides a means for uniquely storing a wireless transceiver identifier which may be used to identify the capabilities and susceptibilities of the wireless transceiver. The wireless transceiver identifier stored within the connector coupling the facsimile machine with the wireless transceiver may be stored in a resident memory storage device such as a RAM or other medium in which a unique identifier may be presented. When the facsimile machine is unable to detect the presence of a wireless transceiver, the facsimile machine defaults to traditional transfer data rate negotiation techniques.

However, when the facsimile machine detects the presence of a wireless transceiver, a fax protocol module negotiates a data transfer rate in a traditional manner, but at a lower data transfer rate. For example, when the facsimile machine detects transmission of facsimile data targeted for a wireless communication channel, the facsimile machine reduces the data transfer rate to a more reliable level than the rate available over a wired communication channel. Such "throttling back" of data transfer rates may be accomplished by storing a series of suggested initial wireless transmission data rates in a table that may be indexed according to a wireless transceiver identifier. It should be noted that either a transmitting or a receiving facsimile machine coupled to a wireless transceiver may initiate the reduction in data transfer rates by presenting the reduced transfer rate during the negotiation process prior to the exchange of facsimile data.

Additionally, during the establishment of the facsimile data exchange session, both the transmitting and receiving facsimile machines engage in exchange of information using an error correction mode which provides for the detection of errors injected into the facsimile data during the transmission process. Some traditional error correction modes include the use of a Class 1 or Class 2 facsimile transmission standard wherein a cyclically redundant code (CRC) is appended to the facsimile information for verification by the receiving party.

A transmitting facsimile then dispatches the facsimile data including the CRC to a receiving facsimile machine which in turn verifies the data to determine if the CRC appended to the facsimile information coincides with the newly generated CRC as calculated by the receiving facsimile machine. When no CRC errors are detected, the transmitting and receiving facsimile machines continue transceiving with a subsequent block of facsimile data. However, when the receiving facsimile machine detects an error in the transmitted facsimile information, a determination is made as to whether the number of errors within the facsimile data exceeds a predetermined error threshold. When the number of errors exceeds a predetermined threshold, a secondary determination is made as to whether a retransmission attempt of the same facsimile data should be undertaken. In one embodiment of the present invention, a threshold value designating the number of retransmissions to be undertaken before the facsimile transmission session is terminated is compared against the number of retransmissions already undertaken. When the number of retransmissions exceeds the retransmission threshold, the fax protocol module undertakes a renegotiation of the data transfer rate. Following the renegotiation of the data transfer rate, the transmitting facsimile, employing the newly renegotiated data transfer rate, transmits the facsimile data to the receiving facsimile machine including an appended CRC thereby facilitating error detection by the receiving facsimile machine. Processing then continues as described above wherein the receiving facsimile machine evaluates the facsimile data to determine if any errors are present and if so, the extent of such errors. Retransmission decisions also are carried out as described above wherein when a retransmission threshold has not been exceeded, the transmitting facsimile machine retransmits the facsimile data at the present data transfer rate. The facsimile machine of the present invention further evaluates the presence of the connection of the wireless transceiver to determine when to revert back to normal wired communication channel data transfer rates when the wireless transceiver interface is terminated with the facsimile machine.

While the facsimile machine of the present invention may take the form of a traditional integrated facsimile machine, the present invention through the figures and detailed description describe a facsimile machine comprised of a host system such as personal computer or notebook computer and a fax modem interfaced to the host for providing the facsimile transceiving capability. In such an embodiment, the host system incorporates a portion of the fax protocol module in one embodiment while the fax modem incorporates a separate portion of the fax protocol module therein. In such an embodiment, the host system performs the error detection function and the retransmit evaluation function while the fax modem performs the data transfer rate negotiation and wireless transceiver identification. In a second embodiment, the host system performs additional functions by incorporating the modulation features as well as the fax protocol portions previously resident within the modem. Such a host signal processing system is commonly known in the industry as a Winmodem ore related architecture. Such architectures lend themselves to being more easily reconfigured by modifying the software within the host system. In such architectures only traditional hardware functionality such as analog to digital and digital to analog conversion remains within the fax modem board.

While the previous description has been drawn to an architecture for carrying out the functionality of a facsimile machine, the methods for carrying out such functionality is also described for improving the successful transmission of facsimile data over a wireless communication channel. Additionally, the software modules for carrying out the above-described functionality are also described within the detailed description and the accompanying figures.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention embodies within its scope both methods and systems for modifying transmission and reception data rates for facsimile data transceived over wireless communication channels. The present invention further embodies methods and systems for detecting the presence of a wireless communication channel and modifying the data transmission rate of either a transmitting facsimile machine or a receiving facsimile machine. Furthermore, the present invention embodies a facsimile machine comprised of a host system such as a computer interfacing with a fax modem capable of transmitting and receiving facsimile data.

Figure 1:
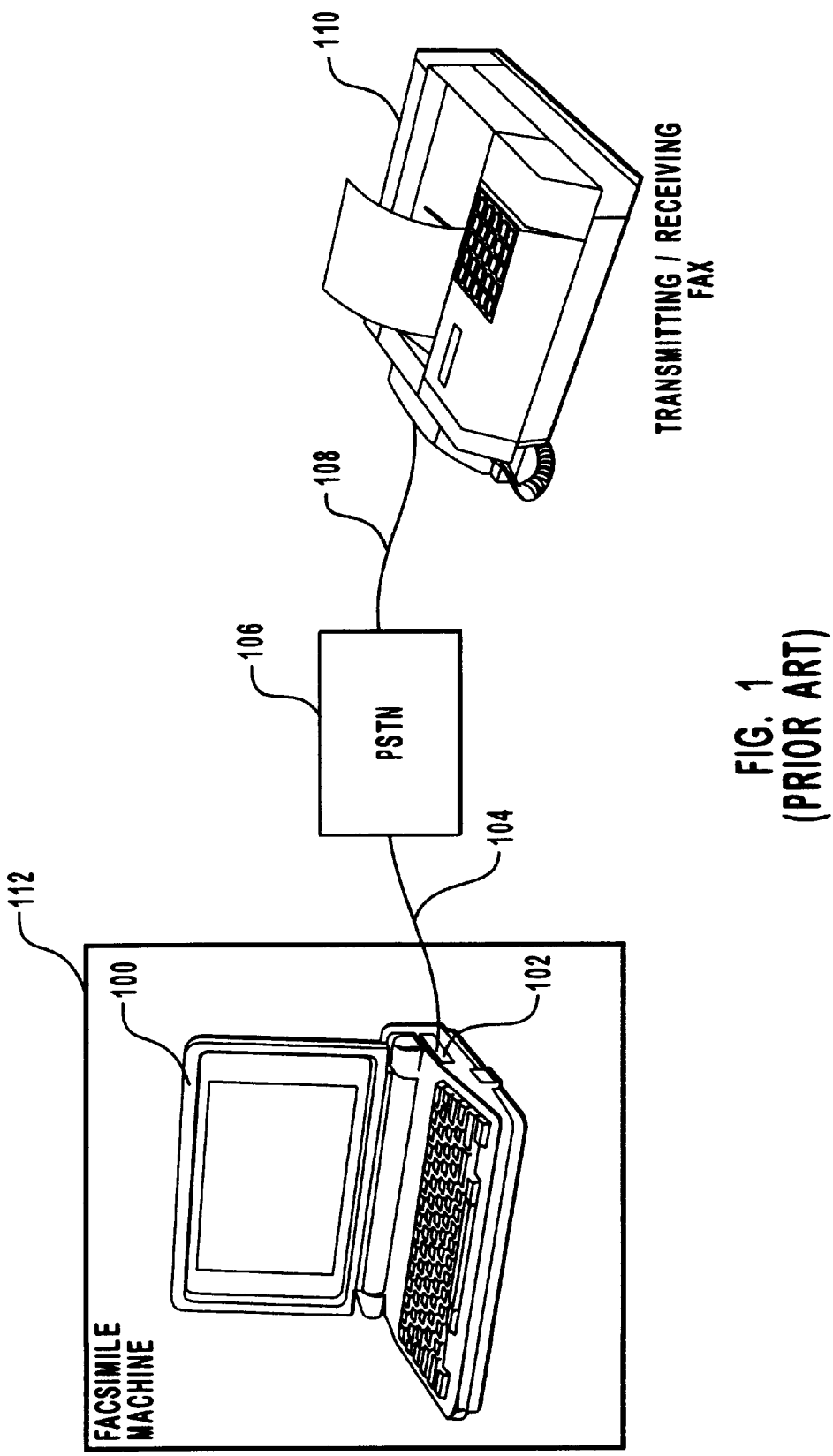
FIG. 1 is a simplified diagram of facsimile machines interconnected through an interconnection network employing wired communication channels, in accordance with the prior art.

As described in FIG. 1, facsimile data has traditionally been transferred over wired communication channels. The present invention contemplates the mobility of facsimile data generators and recipients and provides both a system and method for transceiving facsimile data over a wireless communication channel. The present invention contemplates the nuances associated with wireless communication channels and provides a system and method for enhancing the reliability of transceived facsimile data.

Figure 2:
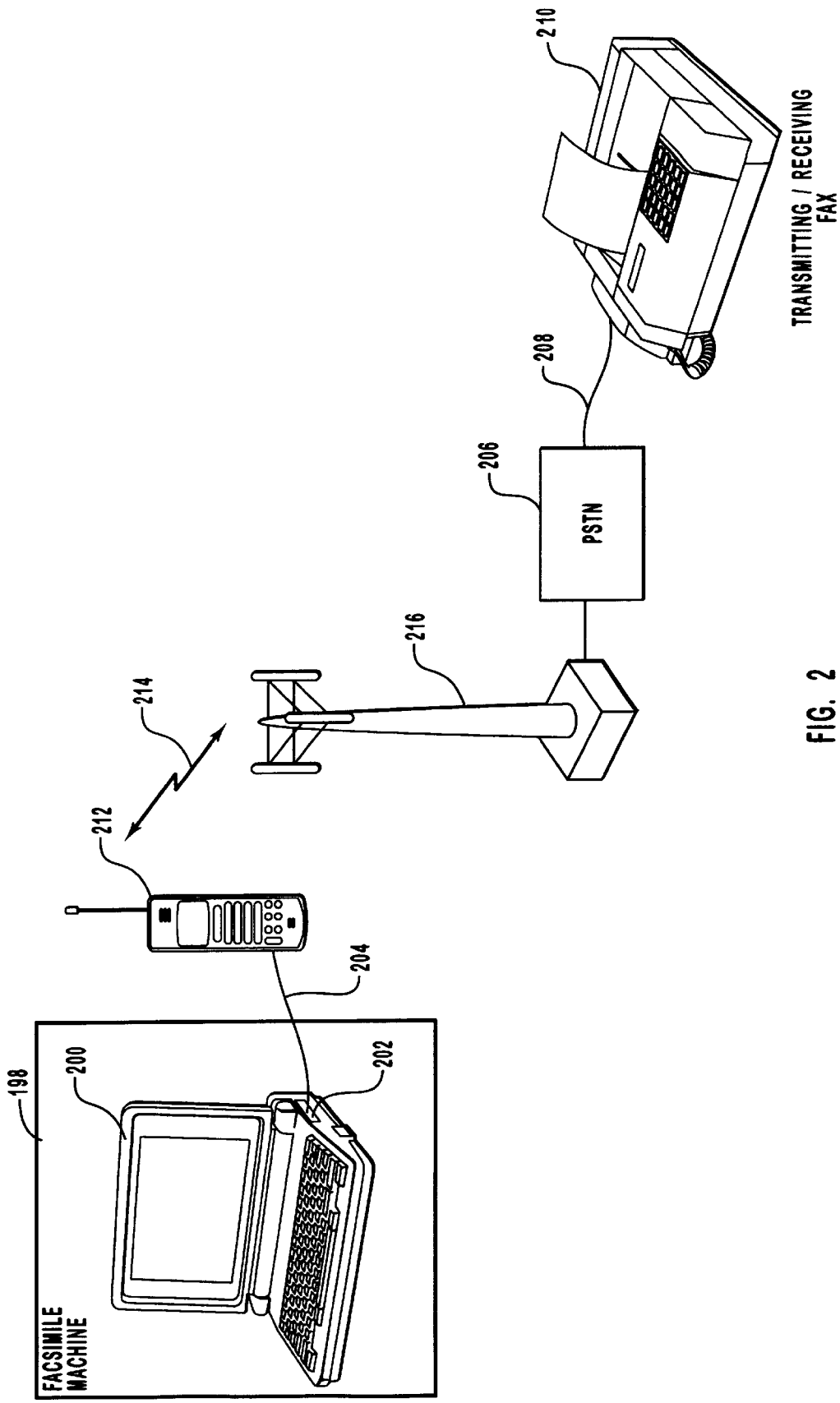
FIG. 2 is a simplified diagram of facsimile machines interconnected through a wireless infrastructure via a wireless communication channel, in accordance with an embodiment of the present invention.

FIG. 2 is a simplified block diagram of a first facsimile machine interfacing with a second facsimile machine via a wireless communication channel, in accordance with a preferred embodiment of the present invention. Traditional facsimile machines have assumed an integrated footprint largely akin to a computer printer coupled with a telephone handset. While such traditional facsimile machines are considered to be within the scope of the present invention, FIG. 2 illustrates an alternative implementation of a facsimile machine. A facsimile machine 198 is illustrated as being comprised of a host 200 and a fax modem 202. Host 200 may take the form of a computer such as a personal computer and for more mobile applications, host 200 may take the form of a notebook or portable computer. Fax modem 202 provides the modulation and demodulation for facsimile data which traditionally takes the form of digital data. Fax modem 202, as illustrated in FIG. 2, takes the form of an I/O circuit board such as an ISA, PCMCIA or other like, interface assemblies supported by host 200.

Facsimile machine 198 interfaces with a wireless transceiver 212 via a cable 204. Wireless transceiver 212 may take the form of a cellular telephone or other wireless transceiver known by those of skill in the art. Cable 204 provides a conduit through which facsimile data may be dispatched between facsimile machine 198 and transceiver 212. While wireless transceiver 212 and facsimile machine 198 are illustrated as discreet components, an integrated version of facsimile machine 198 and wireless transceiver 212 is contemplated by the inventors as being within the scope of the present invention. Additionally, as disclosed above, facsimile machine 198 may also assume an integrated form factor distinct from a computer and fax modem.

Wireless transceiver 212 transceives facsimile data over a wireless communication channel 214 established with wireless infrastructure 216. Wireless infrastructure 216 may take the form of cellular wireless infrastructure, PCS wireless infrastructure or other wireless infrastructure employing propagation of electromagnetic signals as its preferred method of communication.

Wireless infrastructure 216 interfaces with a wired communication network 206 to provide the appropriate routing via a wired communication channel 208 to a remote facsimile machine 210. Alternatively, wireless infrastructure 216 may establish a second wireless communication channel (not shown) thereby bypassing any wired communication channel and relying solely on wireless communication channels as a means of connecting facsimile machine 198 with facsimile machine 210. Communication network 206 may take the form of the public switch telephone network (PSTN) or other established, or yet to be established, computer networks including the integrated services digital network (ISDN).

Facsimile machine 210, while illustrated as a traditionally integrated facsimile machine, may also take other forms such as that illustrated by facsimile machine 198. That is to say, facsimile machine 210 may be comprised of a host and a separate or integrated fax modem for providing traditional modulation functionality. Additionally, facsimile machines 198 and 210 need not provide printing or display capabilities for facsimile data as illustrated by the display of facsimile machine 198 and the printing capabilities as illustrated by facsimile machine 210. The present invention contemplates only the need for facsimile machines 198 and 210 to exchange facsimile data therebetween.

Figure 3:
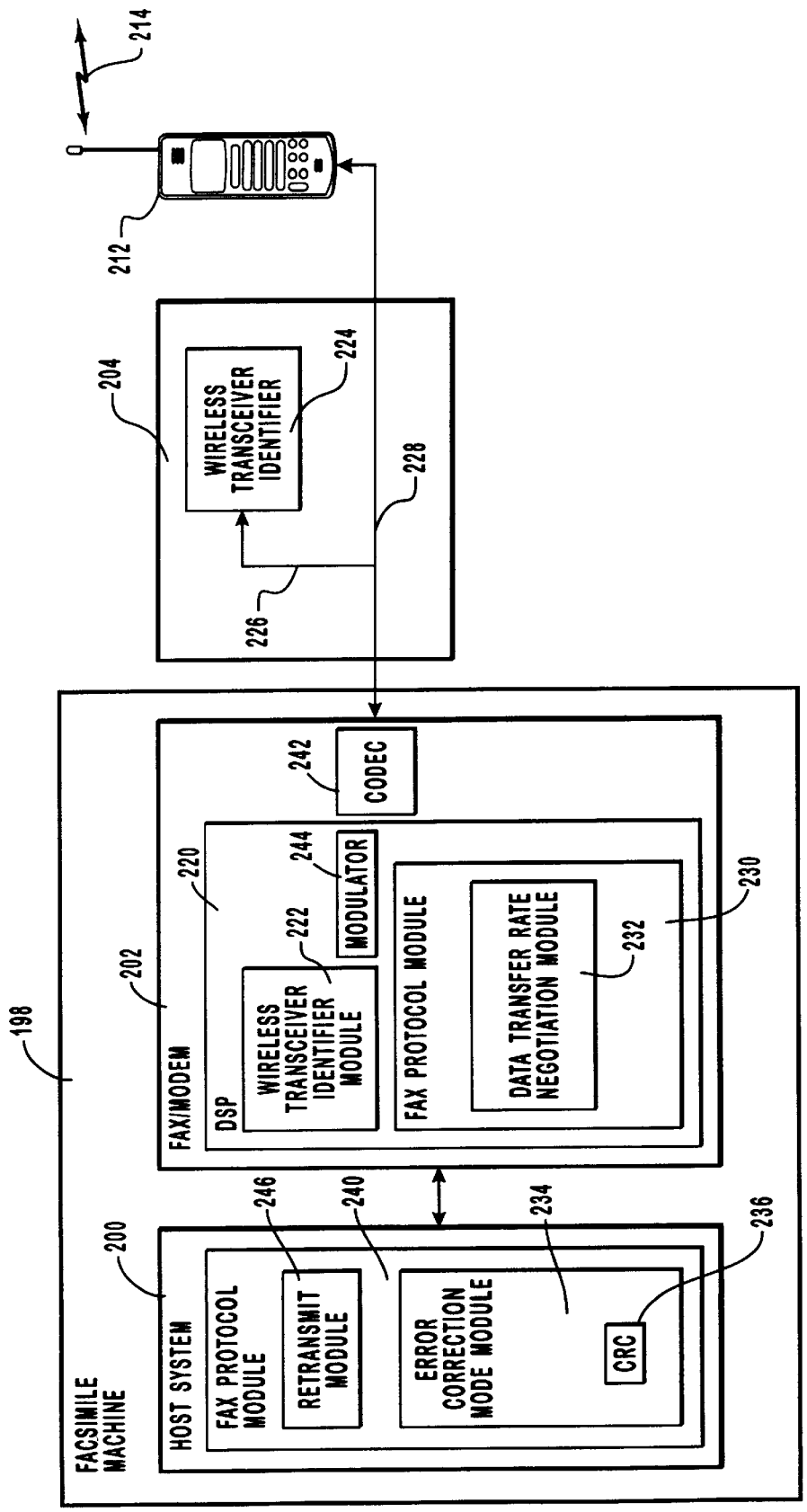
FIG. 3 is a simplified block diagram of a facsimile machine interfaced with the wireless transceiver for communication over a wireless communication channel, in accordance with the preferred embodiment of the present invention.

FIG. 3 is a more detailed block diagram of a facsimile machine interfacing with a wireless transceiver for exchange of facsimile data over a wireless communication channel, in accordance with a preferred embodiment of the present invention. Facsimile machine 198, as described above, may be broadly comprised of a host 200 and a fax modem 202. Host 200 may take the form of a personal computer or other microprocessor or microcontroller configuration capable of executing programmed instructions. Host 200 is illustrated as being inclusive of a program or software application comprised of a fax protocol module 240. Fax protocol 240 executes the selected or established facsimile protocol necessary for compatible exchange of imagery or other descriptive data.

In the present invention, the facsimile protocols contemplated within the scope of the present invention include Class 1, Class 2 and other facsimile protocols incorporating error detection capabilities. In FIG. 3, facsimile protocol module 240 illustrates the error detection capability module associated with a compatible facsimile protocol. FIG. 3 illustrates the use of facsimile protocol Class 1 incorporating an error correction mode module 234 for use in detecting transmission errors incurred across a communication channel. Error correction mode module 234 incorporates a cyclically redundant code (CRC) 236 as an error correction appendage to the information portion of the facsimile data containing the transmitted facsimile information. Host 200, when operating as a portion of a transmitting facsimile machine, generates and appends the CRC to the facsimile information to form the facsimile data. Conversely, when host 200 operates as a portion of a receiving facsimile machine, error correction mode module 234 generates a CRC from the received facsimile information and compares the CRC generated at the receive facsimile machine from that originating at the transmit facsimile machine. When the CRCs do not match, error correction mode module 234 detects the presence of an error as injected by the communication channel.

A fax modem operably couples to host 200 via a compatible interface such as those known by those of skill in the art. Fax modem 202 comprises a processing means for executing programmed instructions such as a digital signal processor 220 or other microprocessor or embedded controller. DSP 220 comprises software modules including a wireless transceiver identifier module 222, fax protocol module 230 and modulator 244. Wireless transceiver identifier module 222 interrogates cable 204 to deduce wireless transceiver identifier 224 as further detailed below and fax protocol module 230 performs data transfer rate negotiation via a data transfer rate negotiation module 232. Data transfer rate negotiation module 232 further facilitates the renegotiation of inner page changes to the data transfer rate. In one embodiment of a fax protocol, data rate negotiation and renegotiation occurs by exchange of a notification such as a tone exchange followed by data rate renegotiation at a more robust default rate that is generally a rate substantially below the original and target data transfer rates. Modulator 244 performs modulation and demodulation of digital data for propagation over communication channels. Fax modem 202 further comprises a CODEC 242 for performing analog to digital and digital to analog conversion of the modulated data. Implementation and integration of CODECs are known by those of skill in the art and therefore are not further discussed herein.

Facsimile machine 198 interfaces with wireless transceiver 212 via a cable 204. Cable 204 incorporates a data bus 228 for facilitating a data path between facsimile machine 198 and wireless transceiver 212. Data bus 228 may take the form of a serial bus including a clock and data signal or a parallel bus or other bus architectures known by those of skill in the art. Several standardized data bus architectures exist for interfacing digital data in modulated format between a modem and cellular or other wireless transceiver.

As discussed above, the present invention provides a method and system whereby a facsimile machine may detect the presence of a wireless communication channel through which facsimile data must traverse. Numerous methods of detecting a wireless communication channel are considered to be within the scope of the present invention. In a preferred embodiment of the present invention, cable 204 may be uniquely configured to a particular model or group of models of a wireless transceiver 212. For example, wireless transceiver 212 fabricated by a first manufacture incorporates a first data interface through which facsimile data passes, while a second manufacture may fabricate a wireless transceiver incorporating a second bus standard through which facsimile data passes.

To accommodate and compatibly communicate with a diverse variety of wireless transceivers, fax modem 202 may benefit from having insight as to the capabilities and type of wireless transceiver interfaced therewith. In the preferred embodiment, cable 204 further incorporates a wireless transceiver identifier 224 uniquely identifying a set or subset of wireless transceivers having particular capabilities. Fax modem 202 interrogates cable 204 via an identification bus 226 to derive wireless transceiver identifier 224 uniquely identifying a type of wireless tranceiver 212. As a result of the presence of wireless transceiver identifier 224, fax modem 202 identifies data bus 228 as connecting with a wireless transceiver. One such cable interface as described above is illustrated in U.S. Pat. No. 5,649,001 to Thomas et al., as incorporated by reference above.

By identifying the interconnection of fax modem 202 with wireless transceiver 212, fax protocol 230 and data rate negotiation module 232 may consider the practicalities of wireless communication channels in making a data transfer rate selection. The limitations of wireless communication channels are widely known and dealt with for voice communication transmissions. That is to say, voice users of wireless communication channels may better tolerate interference and fading associated with the physical limitations of wireless communication channels. For example, small losses of voice information may be tolerated in voice communications as the human mind can accommodate minor lapses in voice information by reconstructing voice information from context information surrounding the lost information. Additionally, voice users of wireless communication channels may take proactive measures that enhance the characteristics of wireless communication channels such as modifying the orientation of a wireless transceiver or temporarily postponing the dispatch of voice information until an interfering condition passes. However, employing subjective and humanistic decision in highly automated data transmission systems such as those exchanging facsimile data is infeasible. Therefore, data transfer rate negotiation module 232 incorporates the practicalities of a wireless communication channel for data transfer in making a decision to reduce the data transfer rate negotiated for facsimile data transfer.

Figure 4:
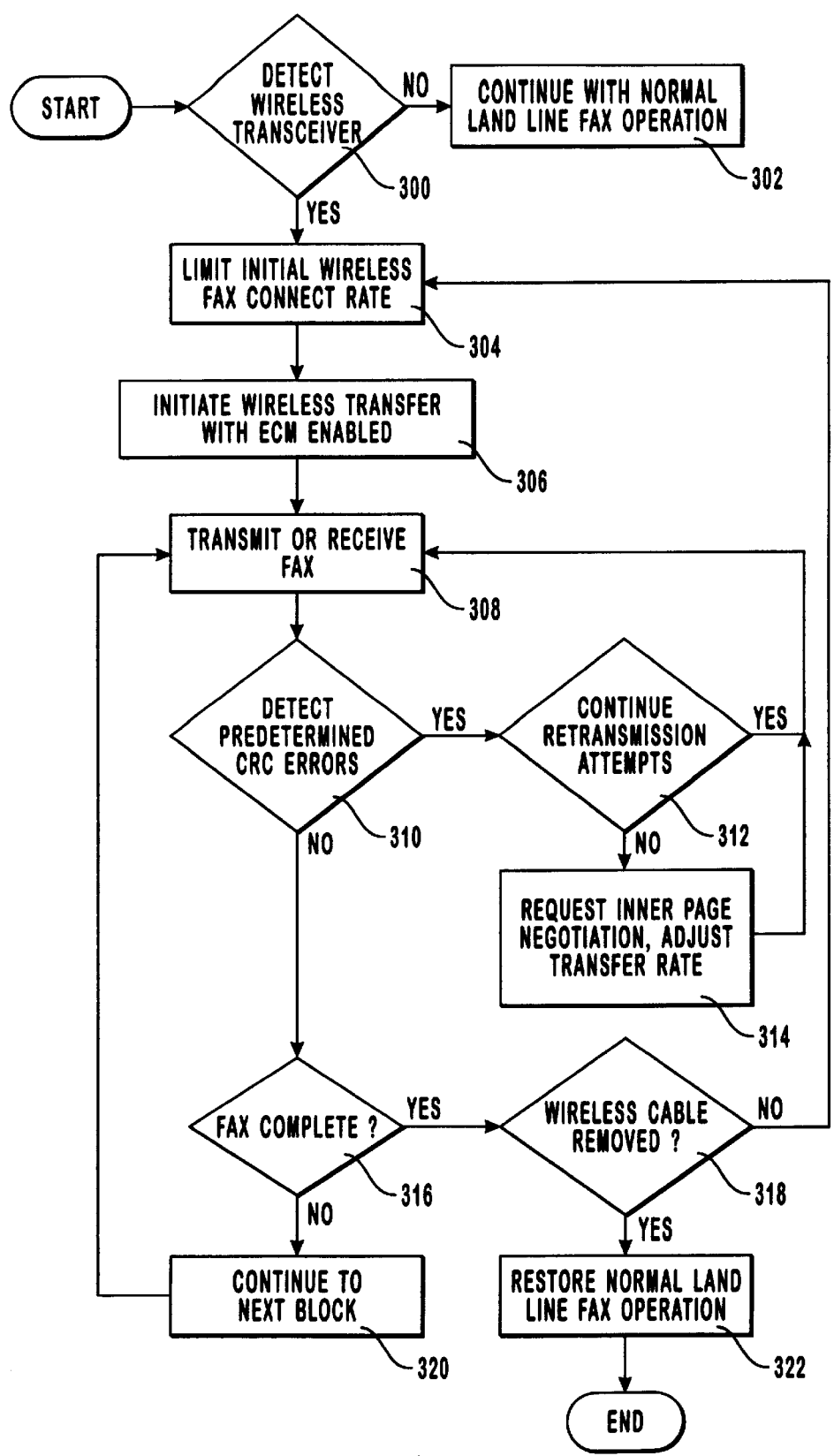
FIG. 4 is a flowchart for modifying fax data transfer rates over wireless communication channels.

FIG. 4 is a flowchart for modifying a data transfer rate of facsimile data over wireless communication channel, in accordance with the preferred embodiment of the present invention. As described above, wireless communication channels present differing challenges for transmission of facsimile data as opposed to transmission of voice information. To accommodate data transmission of facsimile data over a wireless communication channel, improving the probability of accurate reception of facsimile data must be paramount. Therefore, facsimile machine 198 (FIG. 3) employs the method as depicted in FIG. 4 to enhance the probability of successful reception of accurate facsimile data.

A detect wireless transceiver query step 300 performs an evaluation of the type of communication channel to be employed for the transmission of facsimile data. When query step 300 determines a wired communication channel will be employed, a task 302 performs traditional fax data transmission and reception procedures. However, when detect wireless transceiver query step 300 determines, for example through a query of cable 204 (FIG. 3), that a wireless transceiver is interconnected therewith, facsimile machine 198 (FIG. 3) makes a determination to limit the initial data transfer rate in step 304. Data transfer rate limitations may be imposed by the capabilities of wireless transceiver 212 (FIG. 3) as determined by wireless transceiver identifier 224 (FIG. 3) or data transfer rates may be limited by the modulation techniques employed by facsimile machine 198 (FIG. 3) which are not conducive for wireless electromagnetic propagation.

Once a data transfer rate of facsimile data has been determined, an initiate wireless transfer of facsimile data employing an error correction mode step 306 establishes a wireless session for transmission of facsimile data. When facsimile machine 198 (FIG. 3) is position as a transmitting facsimile machine, the transmitting facsimile machine requests the data rate transmission capability from the receiving facsimile machine. The transmitting facsimile machine upon receipt of the receiving facsimile machine's capability, makes a determination based upon the receiving facsimile machine's capability in conjunction with its own transmission capability to determine the data transmission rate to be employed during the facsimile data transmission session. Conversely, when facsimile machine 198 (FIG. 3) assumes the position of being the receiving facsimile machine, the receiving facsimile machine divulges the transmission capabilities to the transmitting facsimile machine for use in determining a data transmission rate for the facsimile data transmission session. In either role, the facsimile machine interconnected with a wireless transceiver selects a data transmission rate more compatible with wireless propagation during the establishment and negotiation of the facsimile data transfer session. Such a selection of a reduced data transfer rate may result from consultation of a transfer rate table resident within host 200 or fax modem 202 as indexed by wireless transceiver identifier 224.

A transmitter receive fax step 308 commences with the dispatch or the reception of facsimile data as processed and packaged by the transmitting facsimile machine. A query step 310 evaluates the CRC associated with the facsimile information contained within the facsimile data to determine the presence of errors injected through the wireless communication channel. Query task 310 compares the quantity of errors detected with a predetermined threshold quantity in making a determination of whether to accept or reject the presented facsimile data. When the threshold of CRC errors is exceeded, a query task 312 performs a determination of either (i) to continue by employing a retransmission process thereby anticipating an improved wireless communication channel or (ii) when retransmission of the facsimile data is considered futile, such as when retransmission attempts for a threshold number of times have also failed, to request inner page negotiation step 314 to adjust the data transmission rate. The inner page negotiation procedure in the preferred embodiment conforms to the Class 1 facsimile specification wherein a tone is transferred to the transmitting modem requesting a renegotiation of the data transfer rate using a reduced frequency. Processing then returns back to a further attempt to transfer or receive facsimile data at the revised data rate.

When query task 310 does not detect a sufficient number of CRC errors, a facsimile complete query step 316 evaluates the present completion status of the quantum of facsimile data. When a portion of the facsimile information remains to be transmitted, a task 320 continues the transmission of the subsequent block of facsimile data.

When query task 316 determines the facsimile data has been completely transferred, a query task 318 monitors the connect-status of cable 204 in a step 318 to detect a disconnection of facsimile machine 198 (FIG. 3) with wireless transceiver 212 (FIG. 3). When cable 204 is disconnected with facsimile machine 198 (FIG. 3), a task 322 restores normal land line fax operation. When query task 318 determines that cable 204 remains connected to fax modem 202, processing returns back to step 304 wherein the initial negotiated data transfer rate will be modified since facsimile data will be traversing a wireless communication channel.

Figure 5:
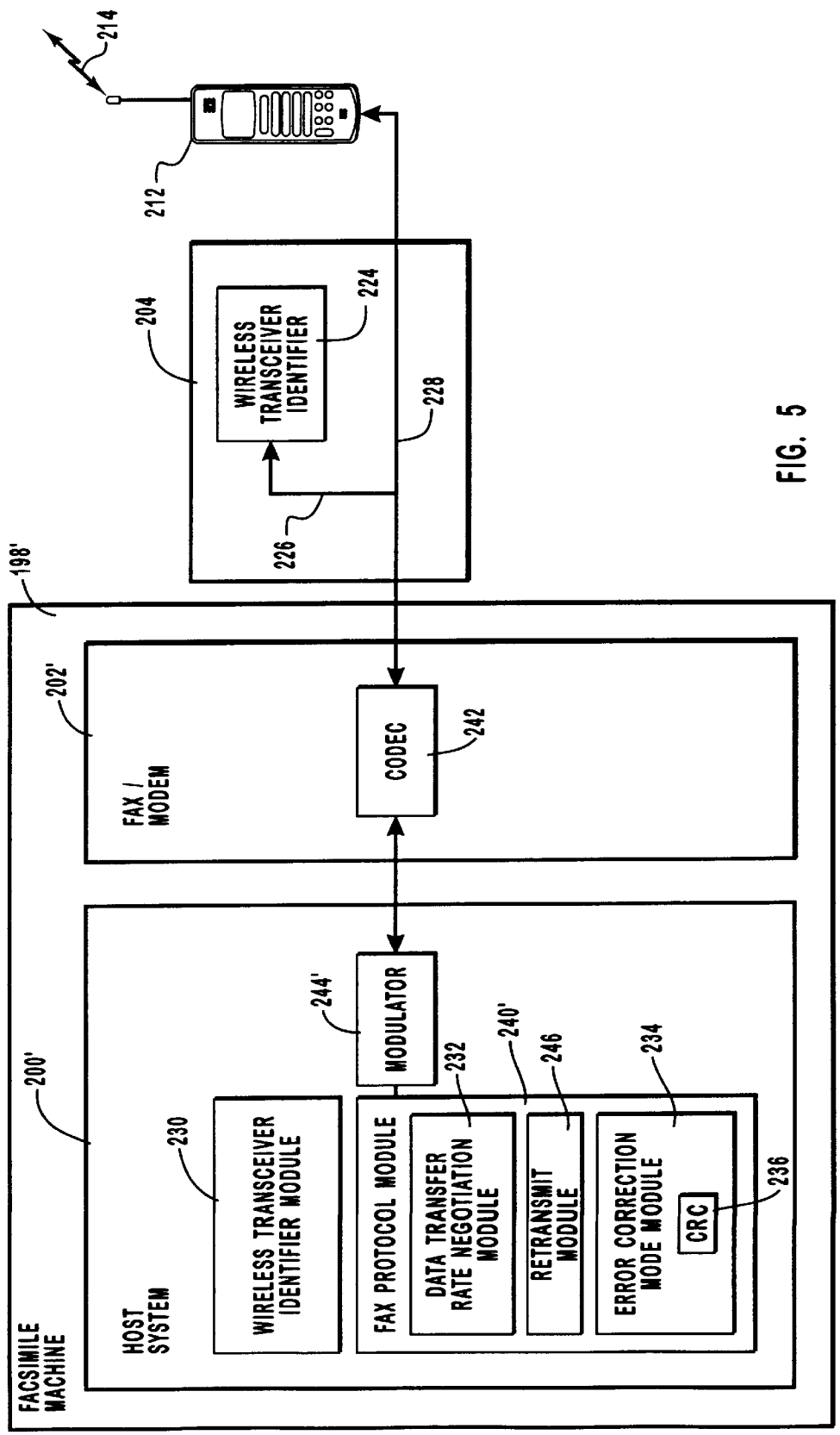
FIG. 5 is a simplified block diagram of a facsimile machine interfaced with the wireless transceiver for communication over a wireless communication channel wherein the host system incorporates a portion of traditional modem functionality therein, in accordance with an alternate embodiment of the present invention.

FIG. 5 is a simplified block diagram of an alternate embodiment of a facsimile machine interfacing with a wireless transceiver for the transmission of facsimile data over a wireless communication channel, in accordance with the present invention. In an alternate embodiment, a facsimile machine 198' is comprised of a host system 200' and a fax modem 202'. In this present embodiment, facsimile machine 198' incorporates the digital signal processing functionality into the host rather than the fax modem of the prior embodiment. Host system 200' may take the form of a personal computer wherein the majority of modem functionality is incorporated into the host system with only minimal functionality remaining within fax modem 202'. Such minimum functionality includes CODEC function 242 which converts between analog and digital formats.

Host system 200' is comprised of a wireless transceiver identifier module 230 previously resident within fax modem 202 (FIG. 3) for reading wireless transceiver idenitifier 224 located within cable 204. Host system 200' further comprises fax protocol module 240' which carries out the fax protocol, such as Class 1, by performing data transfer rate negotiation module 232 and error correction mode module 234 as detailed above in FIGS. 3 and 4.

The present embodiment incorporates advanced digital signal processing executed within the host system, also known as native signal processing or host signal processing. Furthermore, native signal processing techniques involving modem functionality have also come to be known by other descriptive names such as Winmodem and other proprietary designations. Host system 200' further incorporates modulation functionality in a modulator 244' providing modulation and demodulation of facsimile data.

The present invention may be embodied in other specific forms without departing from its spirit or essential characteristics. The described embodiments are to be considered in all respect only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a facsimile machine interfaced to a wireless transceiver, a method for improving successful transmission of facsimile data over a full duplex point to point wireless communication channel, said method comprising the steps of:
   (a) detecting a connection of said facsimile machine with said wireless transceiver for transceiving said facsimile data over said full duplex point to point wireless communication channel;
   (b) upon detection of said connection of said facsimile machine with said wireless transceiver, enabling monitoring of said facsimile data for evaluating data errors;
   (c) establishing said full duplex point to point wireless communication channel with a data transfer rate corresponding with the capability of said wireless transceiver as a data transfer rate;
   (d) transceiving said facsimile data over said full duplex point to point wireless communication channel, said facsimile data transceived over said full duplex point to point wireless communication channel being directly compatible with said facsimile machine; and
   (e) during said transceiving of said facsimile data, altering said data transfer rate when said facsimile data includes a threshold number of data errors resulting from transmission over said full duplex point to point wireless communication channel.

2. The method as recited in claim 1, wherein said detecting said interface of said facsimile machine with said wireless transceiver step comprises the step of said facsimile machine reading an identifier designating a specific type of said wireless transceiver.

3. The method as recited in claim 2, wherein said reading said identifier step comprises the step of reading said identifier associated with a connector interfacing said facsimile machine with said wireless transceiver, said connector being unique to a type of said wireless transceiver.

4. The method as recited in claim 1, wherein said establishing said wireless communication channel with an initial data transfer rate step further comprises selecting an initial data transfer rate corresponding to a rate less than the maximum data transfer rate capable by said wireless transceiver.

5. The method as recited in claim 1, wherein said establishing said wireless communication channel with an initial data transfer rate step further comprises the step of employing a facsimile transmission standard that incorporates error detection, retransmission and data transfer rate renegotiation capabilities.

6. The method as recited in claim 5, wherein said facsimile transmission standard takes the form of the class 1 facsimile standard further employing the error correction mode (ECM) capability therein.

7. The method as recited in claim 1, wherein said altering said data transfer rate when said facsimile data includes data errors step comprises the steps of:
   a) when said facsimile machine receives said facsimile data, requesting a lower data transfer rate of a transmitting facsimile machine;
   b) when said facsimile machine transmits said facsimile data, reducing said data transfer rate when requested by a receiving facsimile machine.

8. The method as recited in claim 7, wherein when said facsimile machine receives facsimile data, requesting a reduction of said data transfer rate when a threshold number of retransmissions at said transfer data rate have failed.

9. The method as recited in claim 1, further comprising the step of when said facsimile machine ceases to detect said wireless transceiver, said facsimile machine establishing a communication channel through negotiation of said initial data transfer rate corresponding with the capability of said facsimile machine.

10. A facsimile machine capable of modifying a data transfer rate of facsimile data transceived over a full duplex point to point wireless communication channel, comprising:
    (a) a fax modem including a wireless transceiver identifier module to detect a connection of said facsimile modem with a wireless transceiver and upon detection of said connection, said fax modem enabling monitoring of said facsimile data for data errors, said fax modem also capable of negotiating and renegotiating during said transceiving of said facsimile data said data transfer rate for transceiving said facsimile data over said full duplex point to point wireless communication channel, said data transfer rate being consistent with the capability of said wireless transceiver and said facsimile data for transceiving over said full duplex point to point wireless communication channel being directly compatible with said facsimile machine; and
    (b) a host operatively coupled with said fax modem to execute a fax protocol employing error detection functionality.

11. The facsimile machine as recited in claim 10, wherein said fax modem further comprises a fax protocol module for performing said negotiation and renegotiation of said data transfer rate for said facsimile data.

12. The facsimile machine as recited in claim 11, wherein said fax protocol module comprises a data transfer rate negotiation module compliant with the class 1 facsimile protocol.

13. The facsimile machine as recited in claim 10, wherein said host further comprises a fax protocol module incorporating error correction mode (ECM).

14. The facsimile machine as recited in claim 13, wherein said fax protocol module further comprises a retransmission module for attempting retransmission of protocol data for a threshold number of times.

15. A fax modem capable of modifying a data transmission rate of facsimile data transceived over a full duplex point to point wireless communication channel, comprising:
    (a) a wireless transceiver identifier module to detect connection of said fax modem with a wireless transceiver; and
    (b) a fax protocol module, whereupon detection of said connection of said fax modem with said wireless transceiver to negotiate said data transfer rate and monitor said facsimile data for evaluating data errors and renegotiate during said transceiving of said facsimile data said data transfer rate for said facsimile data when said facsimile data includes a threshold number of data errors, said facsimile data transceived over said full duplex point to point wireless communication channel being directly compatible with a facsimile machine.

16. The fax modem as recited in claim 15, wherein said fax protocol module comprises a data transfer rate negotiation module compliant with the Class 1 facsimile protocol.

17. A computer-readable medium for a facsimile machine interfaced to a wireless transceiver to improve transmission of facsimile data over a full duplex point to point wireless communication channel, said computer-readable medium having computer-executable instructions for performing steps comprising:

(a) detecting a connection of said facsimile machine with said wireless transceiver for transceiving said facsimile data over said full duplex point to point wireless communication channel;

(b) upon detection of said connection of said facsimile machine with said wireless transceiver, enabling monitoring of said facsimile data for evaluating data errors;

(c) establishing said full duplex point to point wireless communication channel with a data transfer rate corresponding with the capability of said wireless transceiver as a data transfer rate;

(d) transceiving said facsimile data over said full duplex point to point wireless communication channel, said facsimile data transceived over said full duplex point to point wireless communication channel being directly compatible with said facsimile machine; and (e) during said transceiving of said facsimile data, altering said data transfer rate when said facsimile data includes a threshold number of data errors resulting from transmission over said full duplex point to point wireless communication channel.

18. The computer-readable medium of claim 17, having further computer executable instructions wherein said detecting said interface of said facsimile machine with said wireless transceiver step comprises computer-executable instructions for performing the step of said facsimile machine reading an identifier designating a specific type of said wireless transceiver.

19. The computer-readable medium of claim 18, having further computer executable instructions wherein said reading said identifier step comprises computer executable instructions for performing the step of reading said identifier associated with a connector interfacing said facsimile machine with said wireless transceiver, said connector being unique to said wireless transceiver.

20. The computer-readable medium of claim 17, having further computer executable instructions wherein said establishing said wireless communication channel with an initial data transfer rate step further comprises computer executable instructions for performing the step of selecting an initial data transfer rate corresponding to a rate less than the maximum data transfer rate capable by said wireless transceiver.

21. The computer-readable medium of claim 17, having further computer executable instructions wherein said establishing said wireless communication channel with an initial data transfer rate step further comprises computer executable instructions for performing the step of employing a facsimile transmission standard that incorporates error detection, retransmission and data transfer rate renegotiation capabilities.

22. The computer-readable medium of claim 17, having further computer executable instructions wherein said altering said data transfer rate when said facsimile data includes data errors step comprises computer executable instructions for performing the steps of:

a) when said facsimile machine receives said facsimile data, requesting a lower data transfer rate of a transmitting facsimile machine;

b) when said facsimile machine transmits said facsimile data, reducing said data transfer rate when requested by a receiving facsimile machine.

23. The computer-readable medium of claim 22, having further computer executable instructions wherein when said facsimile machine receives facsimile data, requesting a reduction of said data transfer rate when a threshold number of retransmissions at said data transfer rate have failed.

24. The computer-readable medium of claim 17, having further computer executable instructions for performing the step of when said facsimile machine ceases to detect said wireless transceiver, said facsimile machine establishing a communication channel through negotiation of said initial data transfer rate corresponding with the capability of said facsimile machine.

* * * * *